3 Sheets—Sheet 1.

J. BARRETT.

LIFTING JACK.

No. 11,051. Reissued Dec. 31, 1889.

(No Model.) 3 Sheets—Sheet 2.

J. BARRETT.

LIFTING JACK.

No. 11,051 Reissued Dec. 31, 1889

WITNESSES:

Darwin L. Wolcott

F. E. Gaither

INVENTOR,

Josiah Barrett by George H. Christy

Atty.

N. PETERS, Photo-Lithographer, Washington, D. C.

3 Sheets—Sheet 3.

J. BARRETT.

LIFTING JACK.

No. 11,051.

Reissued Dec. 31, 1889.

Witnesses:

J. N. Cooke

F. G. Kay

Inventor:

Josiah Barrett

UNITED STATES PATENT OFFICE.

JOSIAH BARRETT, OF ALLEGHENY, PENNSYLVANIA.

LIFTING-JACK.

SPECIFICATION forming part of Reissued Letters Patent No. 11,051, dated December 31, 1889.

Original No. 399,470, dated March 12, 1889. Application for reissue filed September 21, 1889. Serial No. 324,683.

*To all whom it may concern:*

Be it known that I, JOSIAH BARRETT, a citizen of the United States, residing at Allegheny, in the county of Allegheny and State of Pennsylvania, have invented or discovered a certain new and useful Improvement in Lifting-Jacks, of which the following is a specification.

The invention described herein relates to certain improvements in that class of power mechanism wherein a step-by-step movement back and forth is required, said mechanism being actively operative in one direction to move or raise a load and passively operative, as it were, in the opposite direction to control the movements of a load. For the purposes of this case I have selected a lifting-jack as one form of power mechanism embodying my invention.

In general terms the invention consists in the construction and combination of mechanical devices or elements, all as more fully hereinafter described and claimed.

Figure 1:
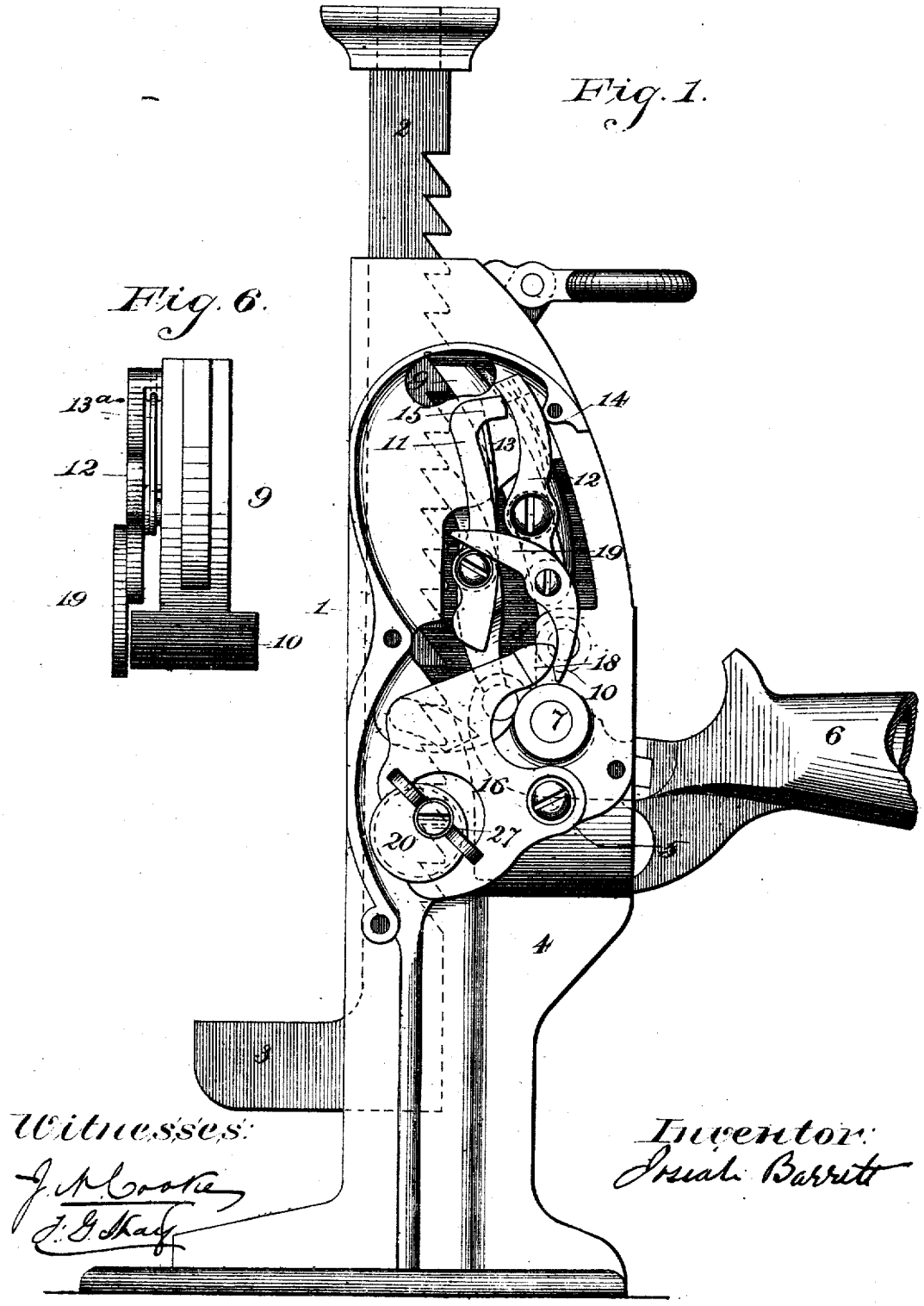
Figure 2:
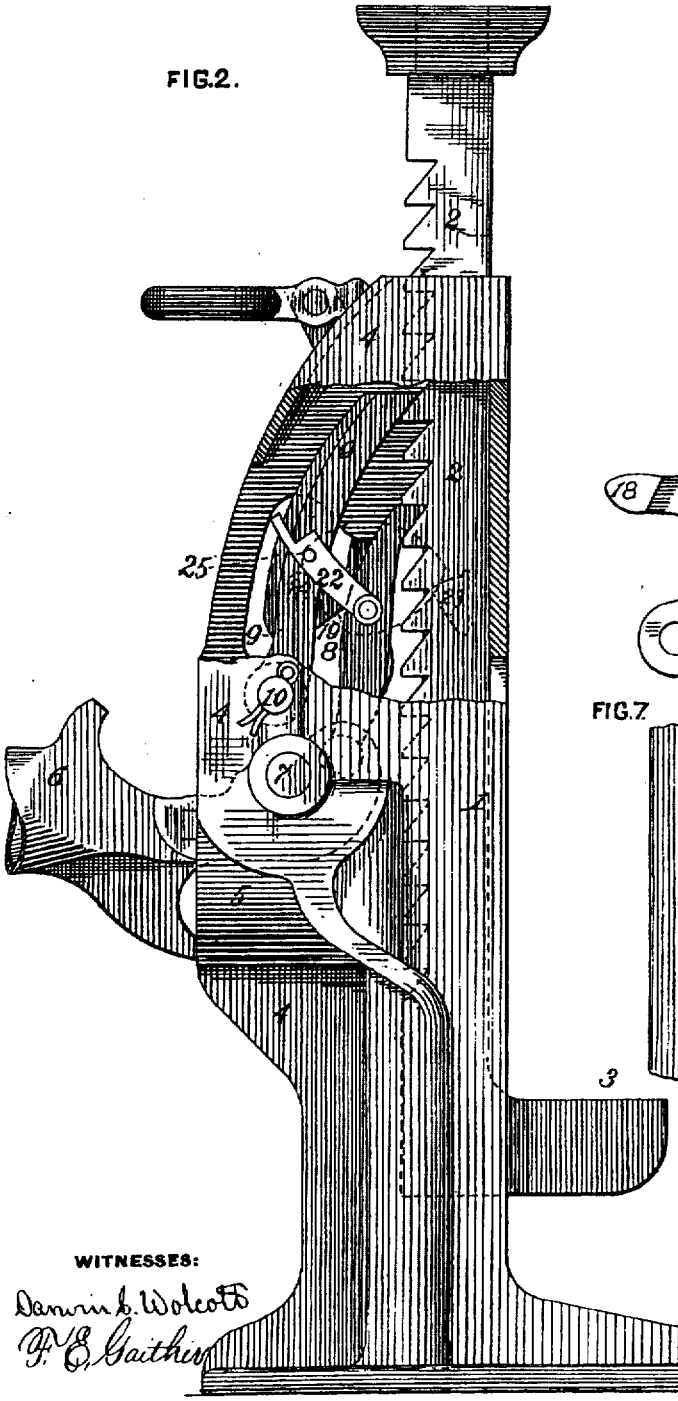
Figure 5:
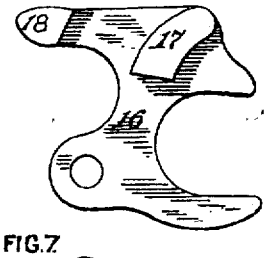
Figure 7:
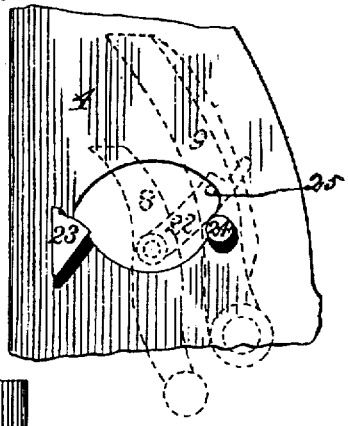
Figure 4:
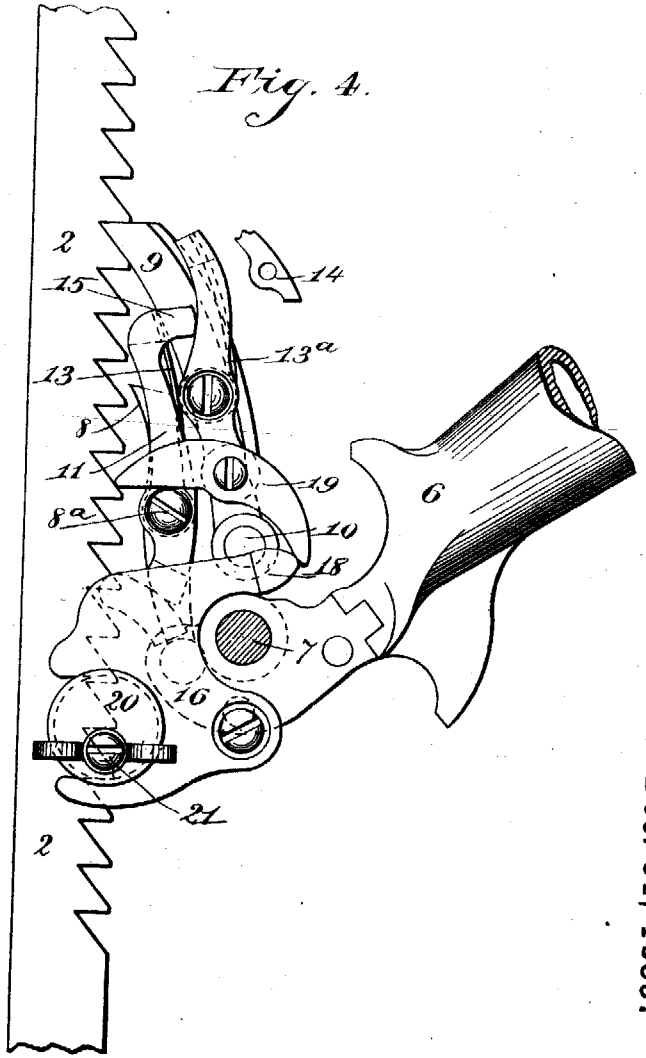
Figure 3:
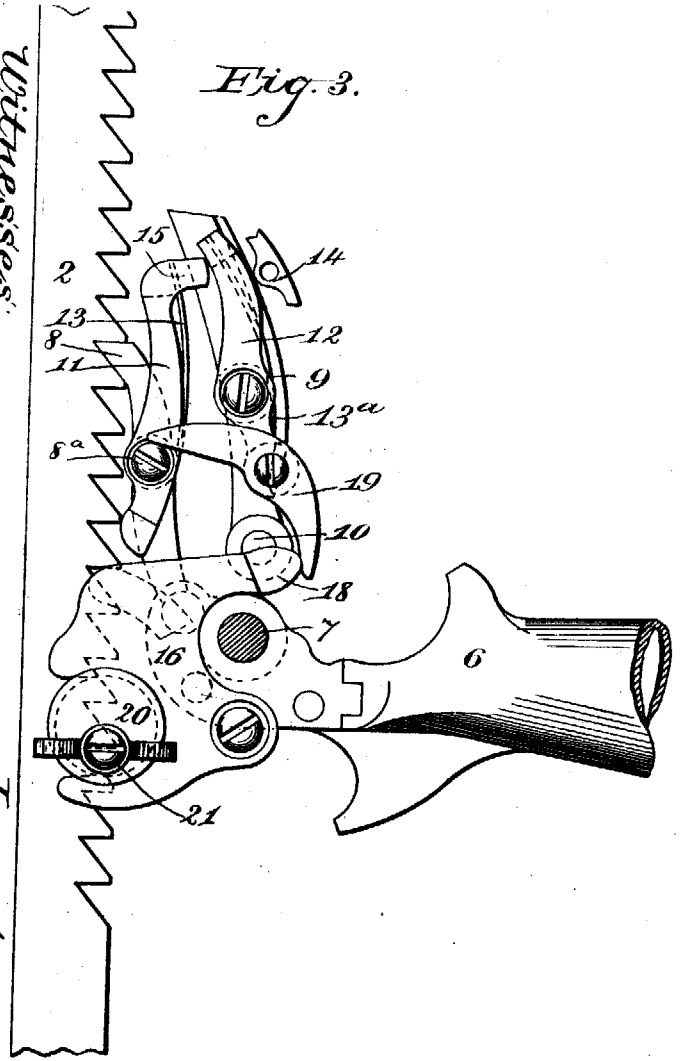

In the accompanying drawings, forming a part of this specification, Figure 1 is a view in side elevation of a lifting-jack embodying my invention, the cap-plate of the jack being removed to show the arrangement of the pawls and their connections. Fig. 2 is a similar view of the opposite side of the jack, the side plate being broken away to show the arrangement of the releasing-dog. Figs. 3 and 4 are diagrammatic views showing the operation of the pawls in lowering the lifting-bar. Fig. 5 is a detail view of the inner face of the tripping-plate. Fig. 6 is a detail view of the detent or holding-pawl; and Fig. 7 is a detail view of a portion of the frame, showing the operation of the releasing-dog.

As described and shown in Letters Patent No. 312,316, granted February 17, 1885, the frame 1 is formed with a longitudinal rectangularly-shaped passage for the reception of the bar 2, which may be provided at its lower end with a toe 3, projecting out through a slot in one side of the frame and extending about two-thirds of the length of the frame. Along the edge of the frame or stand opposite that provided with the slot, as above stated, is formed a flange 4, provided at its lower end with an abutment 5, said abutment and flange forming a socket for the reception of the inner end of the operating-lever 6. This lever is pivotally mounted on a pin 7, passing through the sides of the socket in the frame 1, and to said lever, at a point forward of its fulcrum, is pivoted a pawl 8, arranged to engage the ratchet-teeth formed along one side of the bar 2. A pawl or detent 9 is pivotally mounted on a pin 10, passing through the sides of the socket, said detent being arranged outside of the pawl 8 and arranged to engage the teeth on the bar 2 at a point above the pawl 8. The pawls 8 and 9 are held normally in engagement with the ratchet-teeth on the bar 2 by levers 11 and 12, pivoted to said pawls a short distance above their fulcra, as shown in Figs. 1, 3, and 4.

Around the pivotal pins of the levers 11 and 12 are arranged the coiled springs 13 and 13[a], one end of each of said springs being connected to the levers at or near their upper ends, the opposite end of said springs being connected to the pawls, as shown in Fig. 6. These springs are arranged to force the upper ends of the levers outwardly or to the right, and the lower ends thereof inwardly or to the left, as shown in Fig. 1; but as the outward movements of the upper ends are prevented by a shoulder or stop 14 on the frame or stand, the lever 12 bearing against said stop, and a projection 15 on the lever 11 bearing against the lever 12, the lower portions of the levers are forced inwardly or to the left, thereby moving the pawls into engagement with the ratchet-teeth on the bar 2. In the lifting-jack constructed as hereinbefore described the lifting-bar is raised during the downstroke of the operating-lever 6, and held in such raised position by the pawl or detent 9 during the upstroke of said lever, the pawl 8 and detent 9 being held against the ratchet-teeth of the lifting-bar by the spring-levers 11 and 12.

In order to lower the bar or permit the movement under the action of the load, the above-described operation of the pawls must be reversed—*i. e.*, the pawl or detent 9 must be held away from the bar 2 during the upstroke of the operating-lever and caused to engage one of the teeth of the bar at the end of such stroke, while the pawl 8 must be held away from the ratchet-teeth during the downstroke of the lever, and at the end of such downstroke must engage one of the teeth of the bar 2 and retain such engagement until the end of the upstroke, when it is forced out of engagement with the ratchet-teeth again. It will be understood that the outer end of the lever 6 is referred to in the above statements as to the directions of the stroke. This reversal of the normal operation of the pawl and detent is effected by the tripping-plate 16, (see Fig. 5,) provided on its inner face with a projection 17, having a suitably-shaped cam-surface for engagement with the lower end of the lever 11, and with a bearing-point or stop 18 for engagement with the auxiliary or releasing lever 19, pivoted on the lower end of the lever 12, as shown in Figs. 1, 3, and 4. This tripping-plate is pivoted at its lower right-hand corner to the abutment 5 of the stand or frame, as shown in Fig. 1, and is supported at its lower left-hand corner by an eccentric 20, fitting within a notch in said plate and mounted on a pin 21, screwing into the stand or frame. During the normal or lifting action of the jack the plate 16 is so held by the eccentric that the projection 17 and stop 18 are out of the paths of movement of the lever 11 and the auxiliary or releasing lever 19, as shown in Fig. 1; but when it is desired to lower or permit the bar 2 to be shifted the eccentric 20 is so turned by means of the wings thereon as to move the plate upward and to the right, thereby bringing the projection 17 and bearing-point or stop 18 into operative relation with the lever 11 and the auxiliary or releasing lever 19. By reference to Figs. 3 and 4 the operation of the tripping-plate 16, the levers 11 and 12, and the releasing or auxiliary lever 19 in disengaging the pawl 8 and detent 9 will be clearly understood, it being premised that in Fig. 3 the operating-lever 6 is shown at the lower limits of its stroke, the pawl 8 being in engagement with the ratchet-teeth of the bar 2, and the detent 9 being held away therefrom, while in Fig. 4 the operating-lever is shown at the upper limits of its stroke or movement, the pawl 8 being held away from the lifting-bar and the detent 9 in engagement therewith. As the lever 6 is raised, thereby lowering the inner end thereof and with it the pawl 8, the bar 2 will be correspondingly lowered, the detent 9 being held from engagement with said bar by the auxiliary lever 19, one end of which bears upon the stop 18 of the cam-plate 16, and the other end upon the pivot-pin 8ª of the lever 11, or other suitable bearing-point movable with the pawl 8. As the pawl 8 descends, the lower end of the lever 11 thereon will come into contact with the cam projection 17 on the plate 16 and be forced outward against the tension of the spring 13, which serves, when the upper end of the lever 11 is held as against outward movement by engagement with the lever 12, to force the pawl 8 inward into engagement with the teeth on the bar 2, as hereinbefore stated. It will be readily understood from the above that the outward movement of the lower end of the lever 11 applies an outwardly-acting but yielding pressure to the pawl 8 proportional to the tension of the spring 13, such pressure being operative to shift the pawl as soon as it is relieved of the weight or pressure of the bar and its load in the manner hereinafter described. As shown in Fig. 3, the inner end of the auxiliary lever 19 rests upon the pin 8ª, and will therefore be lowered during the downward movement of the pawl 8, thereby permitting of the inward movement of the lower end of the lever 12 and with it the detent 9, actuated by the spring 13ª, the upper end of the lever 12, to which one end of said spring is connected, bearing against the stop 14. The devices governing this inward movement of the detent 9 are so constructed and arranged that the detent will engage one of the teeth of the bar 2 and prevent farther downward movement thereof a little before the lever 6 completes its full upward movement, thereby relieving the pawl 8 of the weight or inwardly-acting force of the bar and its load, and permitting of said pawl being forced outwardly by the spring 13, as hereinbefore stated. During the downward stroke of the lever 6 the pawl 8 will be raised, thereby permitting of the gradual release of the lower end of the lever 11 from engagement with the cam projection 17, and the consequent forcing of the upper end of said lever outward to a bearing upon the lever 12, and after such a bearing has been effected the forcing inwardly of the lower part of said lever and the pawl 8 by the spring 13. As the pawl 8 moves upward, the pin 8ª raises the inner end of the auxiliary lever 19, thereby forcing the lower end of the lever 12 outward and the upper end thereof inward away from the stop 14 against the tension of the spring 13ª. This changing of the bearing point or fulcrum of the lever 12 from its upper to its lower end subjects the detent 9 to an outwardly-acting and yielding pressure sufficient, when the detent is relieved of the weight of the bar 2 and its load, to force the detent away from the lifting-bar.

The above-described parts controlling the movements of the pawl 8 are so constructed as to permit of the engagement of said pawl 8 with one of the teeth of the bar 2 a little before the completion of the downward stroke of the lever 6, and hence a slight upward movement is imparted to the bar at the completion of the downstroke, thereby relieving the detent of the weight of the bar and its load and permitting of the outward movement of the detent, as above described.

In some cases it is desirable to disengage the pawl and detent simultaneously, so as to drop the bar and its load suddenly; and to this end a releasing-dog 22 is pivoted to the pawl 8 on the side opposite the lever 11, as shown in Figs. 2 and 7, said dog being provided with a notch in its free end adapted to engage a shoulder or projection 23, formed on the inner wall of the recess containing the operating mechanism.

The dog and shoulder are so arranged with reference to each other and the function to be effected that when the pawl 8 is at the lower limit of its movement the notch in the end of the dog will engage the shoulder or projection 23; hence as the pivotal point of the dog is below the shoulder when the pawl 8 is lowered, said pawl will, during its upward movement, be forced outward clear of the teeth on the bar, and, coming in contact with the detent 9, will also force it out of engagement with the bar. During the normal operation of the jack the dog is turned back and rests upon a projection 24 on the inner wall of the frame. The dog is shifted into and out of operative position by a pin 25 thereon, said pin projecting through an opening in the wall of the recess in the frame, as shown in Fig. 7.

Although I have shown and described my invention as applied to lifting-jacks, it will be understood that the mechanism hereinbefore described can be readily applied to other purposes without departing from the spirit of my invention.

I claim as my invention—

1. A toothed bar, in combination with a pivotal lever, a pawl pivoted to said lever, a detent pivoted to the frame, and spring-actuated levers pivoted to said pawl and detent and having their upper ends rigidly supported as against the action of their actuating-springs, substantially as set forth.

2. A toothed bar, in combination with a pivoted operating-lever, a pawl pivoted to said lever, a detent pivoted to the frame, spring-actuated levers pivoted to said pawl and detent, an auxiliary lever pivoted to the lower end of the spring-actuated lever on the detent, a stud or projection on the pawl adapted to engage one end of the auxiliary lever, a movable tripping-plate having a cam-lug, and a stop or shoulder respectively adapted in certain positions of the plate to engage and shift the lower end of the pawl and to hold one end of the auxiliary lever as against inward movement, substantially as set forth.

3. A toothed bar, in combination with a pivoted operating-lever, a pawl pivoted to said lever, a detent pivoted to the frame, spring-actuated levers pivoted to said pawl and detent, an auxiliary lever pivoted to the spring-actuated lever of the detent below its pivotal point, and a stud or projection on the pawl adapted to engage one end of the auxiliary lever, the levers on the pawl and detent being so arranged, as described, that when rigidly supported at their upper ends as against the action of their springs they will operate to hold the pawl and detent against the toothed bar, and when the lower end of the pawl and the ends of the auxiliary levers are similarly supported they will cause the pawl and detent to move away from the toothed bar, substantially as set forth.

4. A toothed bar, in combination with a pivoted operating-lever, a spring-actuated pawl pivoted to said lever, a spring-actuated detent pivoted to the stationary frame, said detent being arranged outside of the pawl, a releasing-dog pivoted to the pawl, and a stop or shoulder on the frame, with which said dog can in certain positions engage and operate to force the pawl and detent away from the toothed bar, substantially as set forth.

5. A toothed bar, in combination with a pivoted operating-lever, a pawl pivoted to said lever, a pawl pivoted outside of said pawl, a releasing-dog pivoted to the inner pawl, and a stop or shoulder on the frame, with which said dog can engage and operate to force both pawls away from the toothed bar, substantially as set forth.

6. The combination of a toothed bar, a pivoted operating-lever, a pawl pivoted to said lever, a pawl pivoted outside of and below the upper end of said inner pawl, and a releasing-dog acting by pressure on the inner pawl to force it and the outer pawl away from the toothed bar, substantially as and for the purposes set forth.

In testimony whereof I have hereunto set my hand.

JOSIAH BARRETT.

Witnesses:
J. N. COOKE,
F. G. KAY.